May 23, 1950        B. N. MINER        2,508,618
FLY ASH ELIMINATOR
Filed Aug. 2, 1948        2 Sheets-Sheet 1
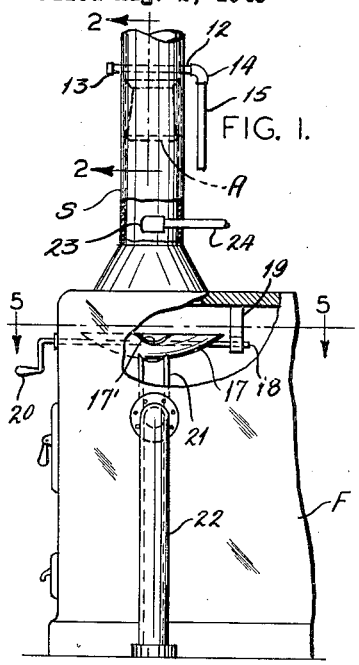
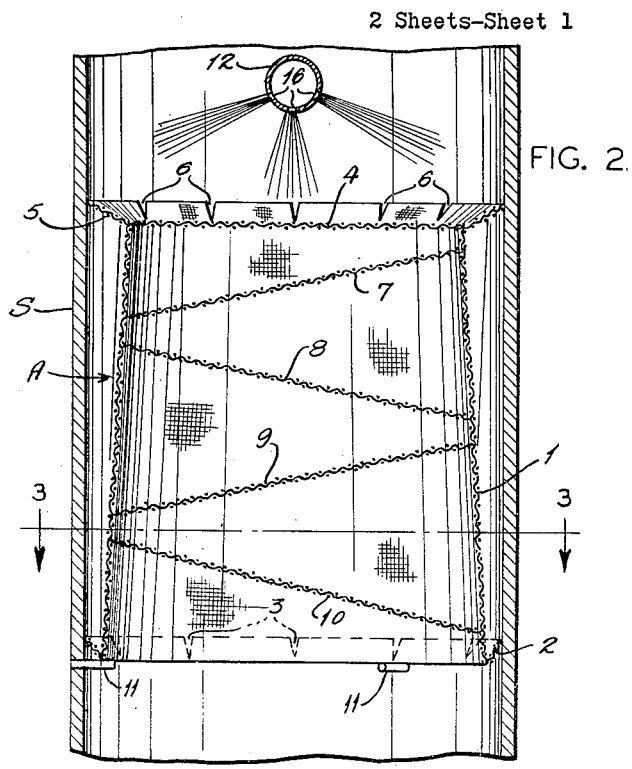
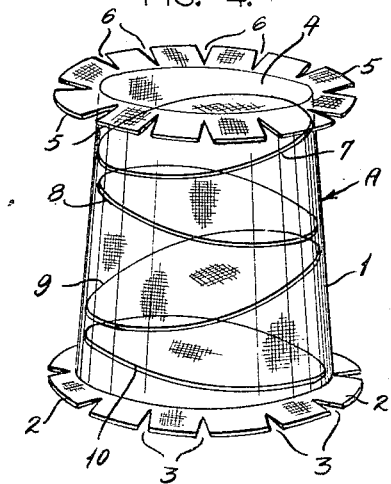
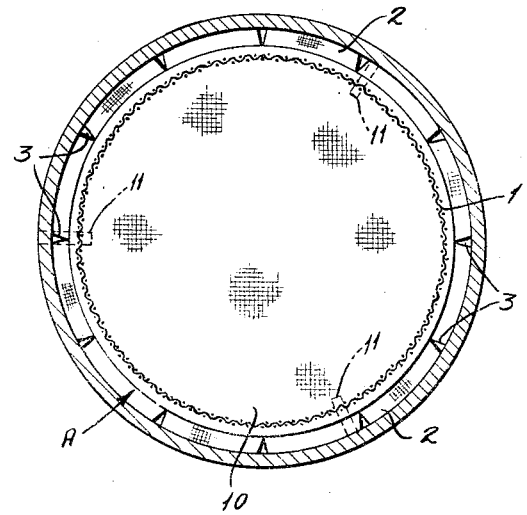
INVENTOR:
BURT N. MINER
BY *Em Harrington,*
ATTORNEY.

May 23, 1950   B. N. MINER   2,508,618
FLY ASH ELIMINATOR
Filed Aug. 2, 1948   2 Sheets-Sheet 2
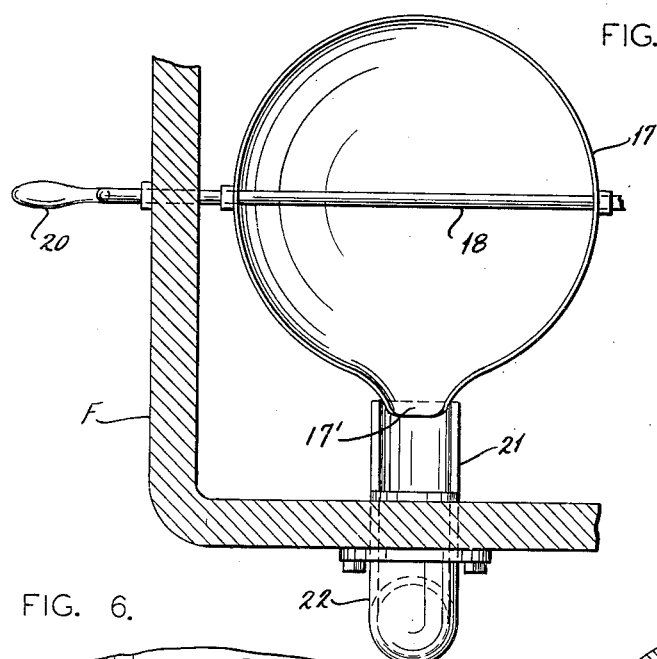
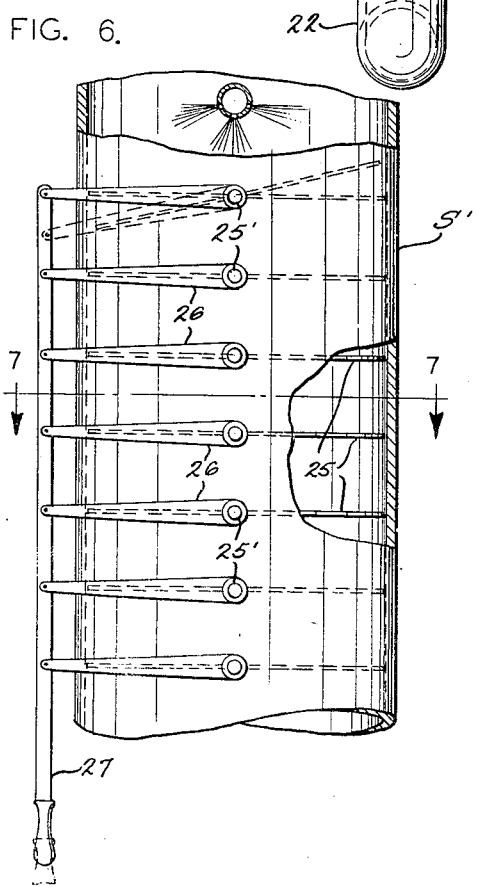
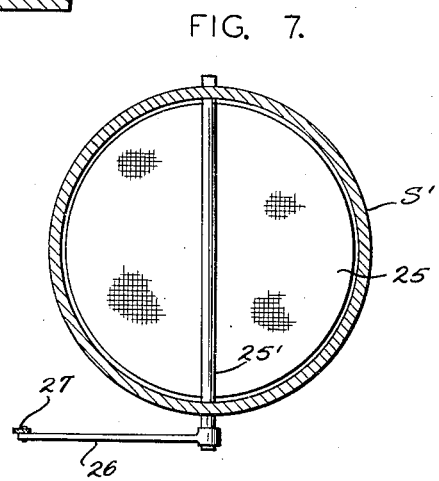
INVENTOR:
BURT N. MINER
BY *Ern Harrington*
ATTORNEY.

Patented May 23, 1950

2,508,618

UNITED STATES PATENT OFFICE 2,508,618

FLY ASH ELIMINATOR

Burt N. Miner, St. Louis, Mo., assignor to St. Louis Fly Ash Elimination Company, St. Louis, Mo., a corporation of Missouri Application August 2, 1948, Serial No. 41,918

5 Claims. (Cl. 183—8)

This invention relates generally to fly ash eliminators and more specifically to such a device which is adapted for disposition in the smokestack of a furnace wherein it functions to trap and moisten fly ash so as to increase the weight of the various particles thereof and thus cause said particles of fly ash to drop downwardly through the upwardly traveling smoke into a receptacle from which said fly ash is washed into a sewer or other conduit that serves to conduct the fly ash away from the furnace, the predominant object of the invention being to provide such a fly ash eliminator which is of extremely simple construction and arrangement and which is capable of performing its intended function in a highly efficient manner.

Fig. 1 is a fragmentary view largely in elevation and partly in section showing the improved fly ash eliminator of this invention arranged in the smokestack of a furnace.

Fig. 2 is an enlarged, fragmentary, vertical section taken on line 2—2 of Fig. 1.

Fig. 3 is a horizontal section taken on line 3—3 of Fig. 2.

Fig. 4 is a perspective of the trap portion of the improved fly ash eliminator of this invention.

Fig. 5 is an enlarged horizontal section taken on line 5—5 of Fig. 1.

Fig. 6 is a fragmentary view, partly in elevation and partly in section, showing a smokestack having associated therewith a modified form of the present invention.

Fig. 7 is a horizontal section taken on line 7—7 of Fig. 6.

In the drawings, wherein are shown for purposes of illustration, merely, two embodiments of the invention, F designates a furnace (Fig. 1) and S designates the smokestack of said furnace (Figs. 1 and 2). The fly ash eliminator of the present invention includes a fly ash trap A which is formed of wire screening, said trap comprising a body portion 1 which is cylindrical in shape and tapers from a larger diameter at the bottom to a smaller diameter at the top. The fly ash trap A is provided at its bottom with an annular flange portion 2 which is formed of wire screening, said flange portion being extended outwardly from the bottom of the body portion of the trap 1 and being provided with circumferentially spaced notches 3 which perform a function to be hereinafter set forth.

The fly ash trap A is provided with a top wall 4 which is formed of wire screening and which is suitably secured to the top portion of the cylindrical body portion 1, said top wall having extended outwardly therefrom an annular flange 5 that is formed of wire screening and which is provided with circumferentially spaced notches 6 that are similar to and perform the same function performed by the notches 3 of the flange 2 at the bottom of the cylindrical body portion of the fly ash trap A. The fly ash trap A has arranged within the cylindrical body portion 1 a plurality of baffles 7, 8, 9 and 10 that are formed of wire screening, said baffles being suitably secured in place within said body portion 1 by spot welding, for instance. The baffles 7, 8, 9, and 10 are inclined, as is shown to good advantage in Fig. 2, the baffles 7 and 9 being substantially parallel and being inclined in one direction, while the baffles 8 and 10 which are substantially parallel are inclined in a different direction. The wire screening of which the baffles 7, 8, 9 and 10 are formed varies as to fineness of mesh; that is to say, the baffle 10 is of relatively coarse mesh and the meshes of the baffles 9, 8, and 7 are progressively finer as the top of the fly ash trap is approached. Also, the mesh of the top wall 4 of the fly ash trap A is finer than the mesh of the baffle 7.

When the fly ash trap A is introduced into the smokestack of a furnace, the flanges 2 and 5 at the bottom and top of said trap are flexed upwardly, as is shown to good advantage in Fig. 2, whereby the resiliency of said flanges will cause the outer edges of said flanges to contact closely with the inner face of the smokestack. Because of this situation no smoke may by-pass the fly ash trap and all smoke is thereby subjected to action by the trap which tends to eliminate fly ash from said smoke. In this connection it is pointed out that the notches 3 and 6 of the flanges 2 and 5 permit of said flanges being contracted circumferentially so that the outer edges of said flanges contact closely with the inner face of the smokestack. The fly ash trap A is supported within the smokestack of a furnace by a plurality of pins 11 which are suitably set into the wall of the smokestack and project inwardly into the interior of the smokestack (Figs. 2 and 3), bottom portions of the fly ash trap resting on said pins to effect the support of said fly ash trap.

The smokestack S, shown in Figs. 1 and 2, is provided with diametrically opposed apertures which support a horizontally disposed pipe 12, said pipe being capped at one end, as shown at 13 in Fig. 1, and being connected by an elbow 14 to a pipe 15 which leads to a source (not shown) of steam vapor, or a suitable chemical solution. The portion of the pipe 12 which is located within the smokestack is provided with perforations 16

(Fig. 2) through which steam vapor, or a suitable chemical solution, is discharged, said perforations being so arranged that the steam or chemical solution is directed downwardly, and in the case of some of the perforations downwardly and outwardly so that said discharged steam vapor or chemical solution is directed downwardly through the fly ash trap A.

Arranged within the upper portion of the furnace F (Fig. 1) is a pan 17 which preferably is provided with a pouring spout 17', said pan being mounted on a shaft 18 which is supported for oscillatory movement by a bracket 19 that is fixed to the top wall of the furnace A and by having a portion of said shaft extended through an aperture formed through the front wall of the furnace (Fig. 5). The pan 17 is fixed to the shaft 18 and said shaft is provided with a crank portion 20 which may be employed to subject the shaft to rotary motion so as to tilt the pan and cause the contents thereof to be discharged from the pan by way of the pouring spout 17'. Fixed to a wall of the furnace F and disposed beneath the pouring spout of the pan 17 is a gutter 21 (Figs. 1 and 5) that is open at the top and which communicates with a pipe 22 which in turn communicates with a sewer, or other means of disposal of matter which is discharged from the pan 17 into the gutter 21. Disposed above the pan 17 and within the lower portion of the smokestack S of the furnace F (Fig. 1) is a shower head 23 to which a pipe 24 leads from a suitable source of water, said pipe 24, as well as the pipe 15, being provided with valve means (not shown) for controlling passage of medium through said pipes.

In the operation of the improved fly ash eliminator of the present invention, smoke from the furnace F moving upwardly through the smokestack S passes through the fly ash trap A and all particles of fly ash which are carried by the smoke would be forced to pass through the screen baffles 7, 8, 9, and 10 if such fly ash particles were to escape to atmosphere with the smoke. However, the meshes of the screening of said baffles become progressively finer from bottom to top of the fly ash trap A, and the mesh of the top wall 4 of said fly ash trap is quite fine, and as a result of this situation practically all particles of fly ash will be baffled by the baffles 7, 8, 9, and 10, or by the top wall 4 and will be trapped within the fly ash trap A and thus will be removed from the upgoing smoke.

During the trapping of the fly ash particles, as described above, steam vapor, or a suitable chemical solution, is being discharged from the perforated pipe 12, and such discharged medium dampens the trapped fly ash particles so as to increase the weight thereof. This causes said fly ash particles to drop or be washed downwardly through any of the baffles through which said particles have passed, said fly ash particles eventually falling into the pan 17 from which they are washed by the water discharged from the shower head 23 into the gutter 21 and the pipe 22. If desired the pan 17 may be tilted periodically, with the aid of the crank portion 20 of the shaft 18, to discharge the contents of said pan into the gutter 21 for passage through the pipe 22. The baffles 7, 8, 9, and 10 are inclined as shown in Figs. 2 and 4 so as to obtain a washing action which facilitates downward movement of the trapped fly ash particles through said baffles, and, also, such inclinations of the baffles exposes greater areas of the baffles to the action of screening the fly ash particles as such particles are being removed from the smoke.

In Figs. 6 and 7 a modified form of the invention is illustrated according to which a plurality of substantially parallel baffles 25 formed of wire screening are disposed within a smokestack S'. These baffles 25 are mounted for oscillation on shafts 25' that are supported for rotation in opposed openings formed in the smokestack wall, and arms 26 are fixed to said shafts, said arms being pivotally connected at their outer ends to an operating member 27. This type of the invention is intended particularly for use with large furnaces wherein mine-run coal is burned, the baffles being set at angles when the fire is started in the furnace through use of the operating member 27, and said baffles being set in approximately horizontal positions after the fire has obtained a good start. In all other respects the structure of Figs. 6 and 7 functions as does the structure of Figs 1 to 5, inclusive, in removing fly ash from smoke moving through the smokestack S'.

I claim:

1. A fly ash eliminator comprising a trap which is pervious to smoke and wherein particles of fly ash are trapped, and means for dampening particles of fly ash trapped by said trap so as to increase the weight of said particles and cause them to drop from said trap, said trap including a cylindrical body portion formed of screening and having a top wall formed of screening, and a plurality of baffles formed of screening which are disposed within said cylindrical body portion, said baffles being spaced vertically within said cylindrical body portion and the meshes of said baffles being progressively finer from bottom to top of said body portion.

2. A fly ash eliminator comprising a trap which is pervious to smoke and wherein particles of fly ash are trapped, and means for dampening particles of fly ash trapped by said trap so as to increase the weight of said particles and cause them to drop from said trap, said trap including a cylindrical body portion formed of screening and having a top wall formed of screening, and a plurality of baffles formed of screening which are disposed within said cylindrical body portion, said baffles being spaced vertically within said cylindrical body portion and the meshes of said baffles being progressively finer from bottom to top of said body portion and the mesh of said top wall of said body portion being finer than the finest mesh baffle.

3. A fly ash eliminator comprising a trap which is pervious to smoke and wherein particles of fly ash are trapped, and means for dampening particles of fly ash trapped by said trap so as to increase the weight of said particles and cause them to drop from said trap, said trap including a cylindrical body portion formed of screening, a plurality of baffles formed of screening which are disposed within said cylindrical body portion, and annular flanges formed of screening which are arranged at the top and bottom of said body portion and extend outwardly from said body portion.

4. A fly ash eliminator comprising a trap which is pervious to smoke and wherein particles of fly ash are trapped, and means for dampening particles of fly ash trapped by said trap so as to increase the weight of said particles and cause them to drop from said trap, said trap including a tapered cylindrical body portion formed of screening, a plurality of baffles formed of screening which are disposed within said cylindrical body portion, and annular flanges formed of screening which are arranged at the top and bottom of said body portion and extend outwardly from said body portion.

5. A fly ash eliminator comprising a trap which is pervious to smoke and wherein particles of fly ash are trapped, and means for dampening particles of fly ash trapped by said trap so as to increase the weight of said particles and cause them to drop from said trap, said trap including a tapered cylindrical body portion formed of screening, a plurality of baffles formed of screening which are disposed within said cylindrical body portion, and annular flanges formed of screening which are provided with circumferentially spaced notches and are arranged at the top and bottom of said body portion and extend outwardly from said body portion.

BURT N. MINER.

REFERENCES CITED

The following references are of record in the file of this patent:

UNITED STATES PATENTS

| Number | Name | Date |
|---|---|---|
| 537,509 | Wardle et al. | Apr. 16, 1895 |
| 538,718 | Wills | May 7, 1895 |
| 963,208 | Jenkins | July 5, 1910 |
| 999,114 | Lang | July 25, 1911 |
| 1,570,577 | Romero et al. | Jan. 19, 1926 |